United States Patent [19]

Heimberg

[11] Patent Number: 4,522,999

[45] Date of Patent: Jun. 11, 1985

[54] VINYLCYCLOPROPANE DICARBOXYLATE POLYESTER OLIGOMER INTERPOLYMER, PROCESS FOR ITS PREPARATION AND SEMI-GLOSS LATEX PAINT OF IMPROVED WET ADHESION CONTAINING THE INTERPOLYMER

[75] Inventor: Manfred Heimberg, Cincinnati, Ohio

[73] Assignee: National Distillers and Chemical Corporation, New York, N.Y.

[21] Appl. No.: 562,556

[22] Filed: Dec. 19, 1983

[51] Int. Cl.$^3$ .................... C08F 32/04; C08F 232/04
[52] U.S. Cl. .................... 526/309; 524/553; 524/564; 524/832
[58] Field of Search ............... 526/309; 524/553, 564, 524/832

[56] References Cited

U.S. PATENT DOCUMENTS

| | | | |
|---|---|---|---|
| 3,669,942 | 6/1972 | Van Westrenen et al. | 526/330 |
| 3,755,237 | 8/1975 | Isaacs et al. | 526/248 |
| 4,113,968 | 9/1978 | Mori et al. | 560/128 |

OTHER PUBLICATIONS

Chem. Abstracts, vol. 91, entry 91499n.
Mater. Dokl. Nauchn. Sess. Itogam Nauchn. o-Issled. Rab. Resp. Koordiniruemym Akad. Nauk Az., SSR, Probl. Estestv. Nauk, 1973, 11th, 1974, 41-43, Elm. Baker USSR.

*Primary Examiner*—Joseph L. Schofer
*Assistant Examiner*—Peter F. Kulkosky
*Attorney, Agent, or Firm*—Kenneth D. Tremain

[57] ABSTRACT

Interpolymers are provided which are based upon the interpolymerization of a vinyl ester of an alpha-unbranched saturated monocarboxylic acid, a monomer selected from the group consisting of an alkyl ester of an alpha, beta ethylenically unsaturated monocarboxylic acid and a vinyl ester of an alpha-branched saturated monocarboxylic acid and a vinylcyclopropanedicarboxylate polyester oligomer or mixture thereof. Optionally, an alpha, beta ethylenically unsaturated carboxylic acid may be added. The interpolymers are particularly useful for formulating surface coatings such as semi-gloss paints where they have been found to significantly improve the wet adhesion properties thereof.

44 Claims, No Drawings

VINYLCYCLOPROPANE DICARBOXYLATE POLYESTER OLIGOMER INTERPOLYMER, PROCESS FOR ITS PREPARATION AND SEMI-GLOSS LATEX PAINT OF IMPROVED WET ADHESION CONTAINING THE INTERPOLYMER

BACKGROUND OF THE INVENTION

The present invention relates to the field of synthetic resins and, more particularly, to interpolymer latexes derived from ethylenically unsaturated monomers and to surface coating compositions such as latex paints containing the interpolymers.

Copolymers derived from vinyl esters such as vinyl acetate and alkyl acrylate esters such as butyl acrylate are well known (viz., U.S. Pat. Nos. 2,086,093; 2,600,450 and 3,310,513; and 4,219,454). Terpolymers prepared from vinyl ester, alkyl acrylate ester and another copolymerizable ethylenically unsaturated monomer are also known (e.g., vinyl monomer containing a methylol or epoxy group in U.S. Pat. No. 3,303,050; ethylene in U.S. Pat. No. 3,334,081; vinyl tertiary acid ester in U.S. Pat. No. 3,446,767-the terpolymers are said to be useful in latex paints, coatings or protective films and adhesives; dicyclopentadiene in U.S. Pat. No. 3,459,699; and alkylcyclohexenylalkyl alcohol esters of alpha, beta-unsaturated acid in U.S. Pat. No. 3,536,687).

SUMMARY OF THE INVENTION

In accordance with the present invention, interpolymer latexes are provided which are derived from the interpolymerization of (a) a vinyl ester of an alpha-unbranched saturated monocarboxylic acid, (b) a monomer selected from the group comprised of an alkyl ester of an alpha, beta ethylenically unsaturated monocarboxylic acid and a vinyl ester of an alpha-branched saturated monocarboxylic acid, (c) optionally an alpha, beta ethylenically unsaturated carboxylic acid and (d) vinylcyclopropanedicarboxylate polyester oligomers of the general formula:

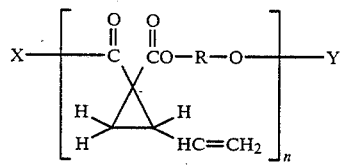

wherein R is a divalent radical derived from a $C_{2-12}$ aliphatic diol, a $C_{3-12}$ cycloaliphatic diol, a $C_{8-20}$ aromatic diol or an ether diol having from 4 to about 60 carbon atoms and 1 to about 30 ether moieties, n is an integer of from 1 to about 20 and X and Y are terminating groups.

When employed as the polymer vehicle in interior semi-gloss latex paint formulations, the interpolymers of this invention significantly improve various properties thereof, in particular, adhesion of the paint to a surface coated therewith when exposed to conditions of high relative humidity or when in contact with a film of condensed liquid water, as for example, on the walls and ceilings of kitchens and bathrooms. Paints having good adhesion under such conditions do not blister and resist removal in a cross-hatch adhesion test (see: H. A. Gardner and G. G. Sward, *Physical and Chemical Examinations: Paints, Varnishes, Lacquers and Colors*, Gardner Labs. Inc., Bethesda, Md., 1962, p. 160). More particularly, such paints are said to have good "wet adhesion".

DESCRIPTION OF THE PREFERRED EMBODIMENTS

The vinyl ester of the alpha-unbranched monocarboxylic acid monomeric component herein can be considered to be derived from the theoretical ethylenically unsaturated alcohol, vinyl alcohol, and any of the alpha-unbranched monocarboxyl acids, e.g., formic acid, acetic acid, propionic acid, butyric acid, trifluoroacetic acid, and the like. A preferred vinyl ester of an alpha-unbranched monocarboxylic acid for use herein is vinyl acetate.

The second category of monomer incorporated into the interpolymers of this invention is selected from the group consisting of an alkyl ester of an alpha, beta ethylenically unsaturated monocarboxylic acid and a vinyl ester of an alpha-branched saturated monocarboxylic acid. Examples of the alkyl esters of an alpha, beta ethylenically unsaturated monocarboxylic acid are methyl acrylate, ethyl acrylate, propyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5- trimethylhexyl acrylate, decyl acrylate, dodecyl acrylate, cetyl acrylate, octadecyl acrylate, cyclohexyl acrylate, phenyl acrylate, methyl methacrylate, ethyl methacrylate, n-propyl methacrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, cyclohexyl methacrylate, norborneneyl methacrylate, benzyl methacrylate, phenyl methacrylate, neopentyl methacrylate, and the like. Of the alkyl esters of an alpha, beta ethylenically unsaturated monocarboxylic acid, butyl acyrlate is preferred.

The vinyl ester of the alpha-branched saturated monocarboxylic acid can be considered to be derived from the theoretical alcohol, vinyl alcohol, and an alpha-branched saturated monocarboxylic acid as in U.S. Pat. Nos. 3,394,114 and 3,455,887, the contents of which are incorporated by reference herein. The latter vinyl esters are represented by the formula:

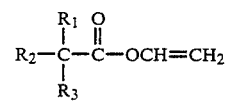

wherein $R_1$ and $R_2$ each represent the same or different alkyl radicals of normal, branched or cyclic structure and $R_1$ represents hydrogen or an alkyl radical. Advantageously, the sum of the carbon atoms present in $R_1$, $R_2$ and $R_3$ does not exceed about 30. Examples of $R_1$, $R_2$ and $R_3$ are methyl, ethyl, propyl, butyl, pentyl, octyl, decyl, etc. Suitable acids are those prepared by the reaction of formic acid, or of carbon monoxide with water with mono-olefins in the presence of liquid, highly acidic, inorganic catalysts, such as sulfuric acid, phosphoric acid, boron trifluoride and water complexes of phosphoric acid, complexes of sulfuric acid, etc., such as described, for example, in U.S. Pat. Nos. 3,047,622; 3,059,004; 3,059,005; 3,059,006; and 3,059,007. The acids prepared by these methods are mixtures of alpha, alpha-dialkyl saturated monocarobxylic acids of one more than the number of carbon atoms as the respective mono-olefin and of the general formula set forth above. Very suitable acids are those prepared from mono-olefinic hydrocarbons such as propylene, butylene-1, butylene-2, isobutylene, pentenes, hexenes, heptenes, octenes, etc. and polymers and copolymers of alkenes such as diisobytylene, propylene trimer, propylene tetramer, etc. under conditions as set forth in the above mentioned patents. Such acids may also be prepared from mixtures of olefins obtained, for example, by cracking paraffins. The vinyl esters of the alpha-branched saturated monocarboxylic acids may be prepared by known methods such as by reaction of the acid or acid mixture with vinyl acetate in the presence of a mercury salt or by reaction of the acid with acetylene in the presence of metallic catalysts such as zinc, cadmium or mercury compounds. Such methods are known to those skilled in the art. A commercially available mixture of esters of the aforedescribed type, namely, VV 10 Vinyl Monomer, is described in a product brochure of the Shell Chemical Company, the contents of which are incorporated by reference herein.

It is, of course, within the scope of this invention to use a mixture of one or more of the foregoing vinyl esters of alpha-branched saturated monocarboxylic acids.

A third and optional category of monomer incorporated into the interpolymers of this invention is selected from the group consisting of alpha, beta ethylenically unsaturated carboxylic acids, exemplified by acrylic, methacrylic acid, crotonic acid, ethacrylic acid, maleic acid, fumaric acid, itaconic acid, and the like.

The vinylcyclopropanedicarboxylate polyester oligomer component of this invention can be represented by the general formula:

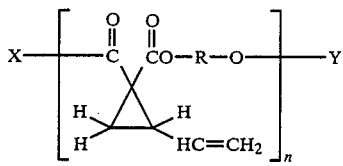

where R represents a divalent aliphatic, cycloaliphatic or aromatic radical or radical derived from an ether diol, n is an integer from 1 up to about 20 and X and Y represent terminating groups. The polyester will generally be used as a mixture of oligomers in which n will range from 1 up to about 10 with the predominant products having a value for n ranging from about 1 to about 5. The terminal group X can be hydroxy, alkoxy (most generally containing from 1 to 4 carbon atoms) or the group —OROH where R is the same as defined above. The terminal group Y can be hydrogen or the radical

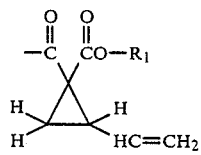

wherein $R_1$ is hydrogen or a $C_{1-4}$ alkyl group. These products are highly reactive under a variety of conditions, due at least in part to the fact that in addition to the reactivity of the vinyl group, the cyclopropane ring can also undergo ring opening thereby providing another site of chemical reactivity.

The aforedescribed vinylcyclopropanedicarboxylate polyester oligomer can be obtained by the reaction of 1-vinylcyclopropane-2,2-dicarboxylic acid or lower alkyl ester thereof with a diol. The vinylcyclopropanedicarboxylic acid or ester can be obtained by any of the known reaction procedures for condensing a 1,4-dihalobutene-2 with malonic esters. For example, the condensation can be accomplished by the classical method, i.e., by reacting the dihalide with the disodio anion of the malonic ester under anhydrous conditions, or using a "phase transfer" process wherein the dihalide is reacted with malonic ester in the presence of an -onium compound, an alkali metal compound and water.

The vinylcyclopropanedicarboxylic acid can be reacted (condensed) directly with the diol to produce the oligomers herein or, as is more commonly the case, the corresponding lower alkyl ester of vinylcyclopropanedicarboxylic acid will be reacted with the diol. Such transalcoholysis reactions are well known to the art and are readily adaptable and advantageous for the preparation of the vinylcyclopropanedicarboxylate polyester oligomer herein. The compounds can also be obtained by ester interchange. Therefore, it is intended and will be understood by those skilled in the art that wherever the vinylcyclopropanedicarboxylic acid is employed, the corresponding lower alkyl esters can also be used. Generally, $C_{1-4}$ alkyl esters, and particularly methyl and ethyl esters, of the 1-vinylcyclopropane-2,2-dicarboxylic acid are employed for transalcoholysis and ester-interchange procedures.

Useful diols for the preparation of the novel oligomer products include branched and straight-chain aliphatic diols, cycloaliphatic diols, aromatic diols and ether diols. As used herein, the term ether diols is intended to encompass condensation products of the aliphatic, cycloaliphatic or aromatic diols, ethoxylated and propoxylated aliphatic, cycloaliphatic or aromatic diols, and ethoxylated or propoxylated derivatives obtained from aliphatic, cycloaliphatic or aromatic polycarboxylic acids.

Aliphatic diols will contain from 2 to about 12 and, more preferably, 2 to about 8 carbon atoms. Cycloaliphatic diols having 3 to about 12 and, more usually, 5 to about 10 carbon atoms can be used. Useful aromatic diols can contain from about 8 up to about 20 carbon atoms and will correspond to the general formula:

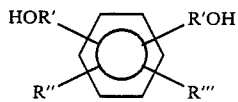

where R' represents a bivalent hydrocarbon radical of 1 to about 6 carbon atoms and R" and R''' are independently hydrogen, a $C_{1-4}$ alkyl group or $C_{1-4}$ alkoxy group.

The ether diols can be derived from the above-described or other aliphatic, cycloaliphatic and aromatic diols. Useful ether diols can contain from 4 up to about 60 carbon atoms and have from 1 to about 30 and, more usually, from 1 to about 20 ether linkages within the molecule. Most generally, these products are obtained from the ethoxylation or propoxylation of the diol, however, other diols or polyols can also be employed to obtain highly useful vinylcyclopropane-2,2-dicarboxylate polyester oligomers.

Illustrative diols of the above types include: ethylene glycol, 1,2- or 1,3-propylene glycol, 1,2-, 1,3- or 1,4-butanediol, 1,5-pentanediol, 3-methyl-1,5-pentanediol, 2,3-dimethyl-1,4-butanediol, 2,3-dimethyl-2,3-butanediol, 1,6-hexanediol,1,8-octanediol, 2-ethyl-1,6-hexanediol, 1,9-nonanediol, 1,10-decanediol, 1,3-cyclopentanediol, 1,2-, 1,3- or 1,4-cyclohexanedimethanol, 4-methyl-1,2-cyclohexanedimethanol, 1,5-cyclooctanediol, 1,2-, 1,3- or 1,4-benzenedimethanol, 2-nitro-p-xylene-alpha, alpha'-diol, 5-nitro-m-xylene-diol, 4-hydroxy-3-methoxyphenethyl alcohol, and the like.

Ether diols which can be used include such compounds as diethylene glycol, dipropylene glycol, triethylene glycol, tetraethylene glycol and higher polyoxyethylene or polyoxypropylene glycols having molecular weights ranging up to about 600. Mixtures of diols of the above types can also be used for the preparation of the polyester oligomers. Ethoxylated and propoxylated polyhydroxylated aromatics such as resorcinol, catechol, hydroquinone and bisphenols are also used to obtain useful oligomeric polyester products. Similarly, the reaction products of ethylene oxide or propylene oxide and aliphatic, cycloaliphatic and aromatic polycarboxylic acids are useful polyols for the preparation of the novel oligomers. Bis(hydroxyethyl)adipate, bis(hydroxyethyl)azelate, bis(hydroxyethyl)dimerate, bis(hydroxyethyl)terephthalate and higher ethoxylates or propoxylates are illustrative of such useful ether diols and polyols.

Substantial amounts of higher polyols may also be present with the diol. Highly complex molecules are possible when higher polyols are present in substantial amounts or constitute the entire alcohol portion, however, such products can find utility in some applications. Suitable polyols for this purpose include trimethylolpropane, glycerol, pentaerythritol, dipentaerythritol, tripentaerythritol, mannitol, sorbitol, and the like.

Polyester oligomers are obtained by reacting diols of the foregoing types with vinylcyclopropanedicarboxylic acid or ester thereof. Typically, however, the resulting products are a mixture of oligomeric polyester compounds in varying amounts, the composition of which is primarily determined by the molar proportions of reactants used for the reaction, the particular diol used and reaction conditions. While a large equivalents excess of either reactant may be utilized for the preparation of these products, most generally the diol and dicarboxylic acid or ester thereof are reacted at equivalents ratios from about 2:1 to 1:2 and, more preferably, the equivalents ratio of diol:vinylcyclopropanedicarboxylic acid or ester thereof will range from about 1.3:1 to 1:1.3. When operating within the above-defined equivalents ratios, the resulting products are typically transparent liquids-ranging from extremely fluid materials to highly viscous (amorphous) masses. The oligomeric products have average molecular weights from about 200 to 15,000 and, more usually, from 300 to 6,000. They are further characterized as having viscosities (24° C.) from about 0.2 to 200 poise and, more preferably, 0.3 to 150 poise.

As pointed out above, the predominant compound(s) present in the mixtures of this invention will be governed to some extent by the molar proportions of the reactants used. For example, if a large equivalents excess of the diol or ether diol is employed, a substantial amount of the product

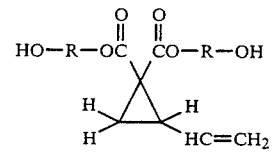

where R is the same as defined above can be present. On the other hand, if a large equivalents excess of the vinylcyclopropanedicarboxylic acid or ester is used, a substantial portion of the product will consist of

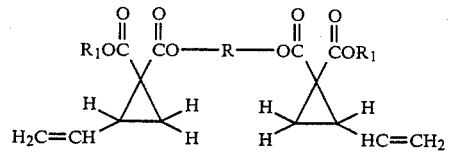

where R and $R^1$ are the same as previously defined. For the above compounds, as with the other oligomeric products herein, it should be noted that various stereo isomers can also exist. While for reasons of economy and convenience, admixtures of the oligomer will ordinarily be used in the preparation of the interpolymers of this invention, it is possible to separate the various components present in the mixtures and thus to use only one or just a few of the isolated products. Separation can be accomplished employing known and conventional techniques, e.g., on an analytical scale employing chromatographic techniques and, in some instances, recovering or enriching lower molecular weight fractions in a desired component by distillation.

The quantities of vinyl ester of an alpha-unbranched saturated monocarboxylic acid, monomer selected from the group consisting of an alkyl ester of an alpha, beta ethylenically unsaturated monocarboxylic acid and a vinyl ester of an alpha-branched saturated monocarboxylic acid, optional alpha, beta ethylenically unsaturated carboxylic acid and vinylcyclopropanedicarboxylate polyester oligomer which are interpolymerized to provide interpolymers herein can vary over fairly wide limits. Thus, for example, from 40 to about 90 parts by weight of vinyl ester of an alpha-unbranched saturated monocarboxylic acid, from about 10 to about 60 parts by weight of a monomer selected from the group consisting of an alkyl ester of an alpha, beta ethylenically unsaturated monocarboxylic acid and a vinyl ester of an alpha-branched saturated monocarboxylic acid, from about 0.5 to 5 parts by weight of an alpha, beta ethylenically unsaturated carboxylic acid, if employed, and from 0.1 to about 1 part by weight of vinylcyclopropanedicarboxylate polyester oligomer can be used herein with good results. It is also within the scope of this invention to include minor amounts, e.g., up to about 10 weight parts of one or more additional monomers which are capable of undergoing interpolymerization with the aforesaid components. Illustrative of such additional monomers are the following: carbon monoxide, sulfur dioxide, ethylene, propylene, 1-butene, 2-butene, isobutylene, 1-pentene, 2-methyl-2-butene, 1-hexene, 4-methyl-1-pentene, 3,3-dimethyl-1-butene, 2,4,4-trimethyl-1-pentene, 3-ethyl-1-hexene, 1-heptene, 1-octene, 1-decene, 1-dodecene, allene, butadiene, isoprene, chloroprene, 1,5-hexadiene, 1,2,5-hexatriene, divinylacetylene, cyclopentadiene, dicyclopentadiene, norbornene, norbornadiene, methylnorbornene, cyclohexene, styrene, alpha-chlorostyrene, alphamethylstyrene, allylbenzene, phenylacetylene, 1-phenyl-1, 3-butadiene, vinylnaphthalene, 4-methylstyrene, 2,4-dimethylstyrene, 3-ethylstyrene, 2,5-diethylstyrene, 2-methoxystyrene, 4-methoxy-3-methylstyrene, 4-chlorostyrene, 3,4-dimethyl-alpha-methylstyrene, 3-bromo-4-methylalpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 2,4-dihydroxystyrene, 3-nitrostyrene, 2-aminostyrene, 4-(N,N-dimethylamino)styrene, 4-phenylstyrene, 4-chloro- 1-vinylnaphthalene, acrolein, methacrolein, acylonitrile, methacrylonitrile, acrylamide, methacrylamide, N,N-dimethylacrylamide, chloroacrylic acid, methyl chloroacrylic acid, chloroacrylonitrile, ethacrylonitrile, N-phenylacrylamide, N,N-diethylacrylamide, N-cyclohexylacrylamide, vinyl chloride, vinylidene chloride, vinylidene cyanide, vinyl fluoride, vinylidene fluoride, trichloroethene, methyl vinyl ketone, methyl isopropenyl ketone, phenyl vinyl ketone, methyl alpha-chlorovinyl ketone, ethyl vinyl ketone, divinyl ketone, hydroxymethyl vinyl ketone, chloromethyl vinyl ketone, allylidene diacetate, methyl vinyl ether, isopropyl vinyl ether, butyl vinyl ether, 2-ethylhexyl vinyl ether, 2-methoxyethyl vinyl ether, 2-chloroethyl vinyl ether, methoxyethoxy vinyl ether, hydroxyethyl vinyl ether, aminoethyl vinyl ether, isopropenyl methyl ether, divinyl ether, divinyl ether of ethylene glycol, divinyl ether of diethylene glycol, divinyl ether of triethanolamine, cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di-(ethylhexyl) maleate, maleic anhydride, dimethyl fumarate, vinyl ethyl sulfide, divinyl sulfide, vinyltolyl sulfide, divinyl sulfone, vinyl ethyl sulfone, vinyl ethyl sulfoxide, vinyl sulfonic acid, sodium vinyl sulfonate, vinylsulfonamide, vinylbenzamide, vinylpyridine, N-vinylpyrrolidone, N-vinylcarbazole, N-(vinylbenzyl)-pyrrolidine, N-(vinylbenzyl)-pyrroline, N-(vinylbenzyl)-piperidine, 1-vinylpyrene, 2-isopropenylfuran, 2-vinyldibenzofuran, 2-methyl-5-vinylpyridine, 3-isopropenylpyridine, 2-vinylpiperdine, 2-vinylquinoline, 2-vinyl benzoxazole, 4-methyl-5-vinylthiazole, vinylthiophene, 2-isopropenylthiopene, indene, coumarin, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide, and the like.

Interpolymerization can be carried out employing any of the known and conventional emulsion polymerization procedures. If desired, the selected quantities of vinyl ester of an alpha-unbranched saturated monocarboxylic acid, monomer selected from the group consisting of alkyl esters of alpha, beta ethylenically unsaturated monocarboxylic acid and a vinyl ester of an alpha-branched saturated monocarboxylic acid, alpha, beta ethylenically unsaturated carboxylic acid, if used, and vinylcyclopropanedicarboxylate polyester oligomer and additional monomers, if any, can be sequentially or simultaneously introduced before and/or during the interpolymerization reaction, and incrementally or all at once, into a reaction medium containing suitable quantities of surface active agent, protective colloid, polymerization catalyst buffer and water. In a preferred procedure, a solution of the protective colloid, the buffer and the surfactants is prepared in the reaction vessel and heated to a temperature about 25° C. below the polymerization temperature. At this point, about 5% of the vinyl ester of an alpha-unbranched saturated monocarboxylic acid is added, followed by the catalyst dissolved in a small amount of water to initiate the polymerization. When the temperature of the reaction reaches 70°–80° C., the remaining vinyl ester of the alpha-unbranched saturated monocarboxylic acid, a monomer selected from the group consisting of an alkyl ester of an alpha, beta ethylenically unsaturated monocarboxylic acid and a vinyl ester of an alpha-branched saturated monocarboxylic acid, an alpha, beta ethylenically unsaturated carboxylic acid, if used, and vinylcyclopropanedicarboxylate polyester oligomer and additional monomers, if used, are added to the reactor vessel.

The surface active agents include any of the known and conventional surfactants and emulsifying agents, principally the nonionic and anionic materials, and mixtures thereof heretofore employed in the emulsion copolymerization of ethylenic monomers. Inclusive of suitable nonionic materials are the aliphatic, aromatic or alicyclic polyoxyalkylene glycols such as the Pluronics and Tetronics (BASF Wyandotte Corp.), the Igepals (GAF Corp. Chemical Products), the Tweens (ICI United States Inc.), the nonionic Tritons (Rohm & Haas Co.) and the Trycols (Emery Industries, Inc.), especially Trycol OP-407, a 70% active nonionic ethoxylated octylphenol having about forty ethyleneoxy units per molecule. Among the many anionic surface active agents which can be used herein are Emersal 6400 (Emery Industries, Inc.), a 30% active solution of sodium lauryl sulfate; Sipon ESY (Alcolac, Inc.), a 25% active solution of a sodium lauryl ether sulfate wherein the lauryl alcohol has been extended with an average of about one ethyleneoxy unit per molecule; Emersal 6453, a 28% active solution of a sodium lauryl ether sulfate wherein the lauryl alcohol has been extended with an average of about three ethyleneoxy units per molecule; Standapol ES-13 (Henkel Inc., USA), a 29% aqueous solution of sodium lauryl ether sulfate wherein the lauryl alcohol has been extended with an average of about three and one-half ethyleneoxy units per molecule; and Avirol 125-E (Henkel Inc., USA), a 58–59% aqueous solution of sodium lauryl ether sulfate wherein the lauryl alcohol has been extended with an average of about twelve ethyleneoxy units per molecule. Additional anionic surfactants which can be used herein are Triton X-200 (Rohm & Haas Co.), a sodium salt of an alkylaryl polyether sulfonate; Triton X-301 (Rohm & Haas Co.), a sodium salt of alkylaryl polyether sulfate; Triton QS-9 (Rohm & Haas Co.), a phosphate ester; Aliphal CO 433 (GAF), a sodium salt of sulfated nonylphenol (ethyleneoxyl) ethanol; and Duponol ME Dry (DuPont), a sodium lauryl sulfate.

In general, amounts of surface active agent of up to about 10 weight percent of the entire reaction medium, and in particular from 2 to about 5 weight percent, can be used with good results.

Protective colloids which can be optionally incorporated in the aqueous reaction media include the partially and fully hydrolyzed polyvinyl alcohols; polyvinylpyrrolidone, e.g., PVP-K30, polyvinylpyrrolidone produced by GAF Corporation; cellulose ethers, e.g., hydroxymethyl cellulose, hydroxyethyl cellulose, ethyl hydroxyethyl cellulose and ethoxylated starch derivatives; the natural and synthetic gums, e.g., gum tragacanth and gum arabic; polyacrylic acid and poly(methyl vinyl ether-comaleic anhydride). The protective colloids can be employed in the usual amounts, e.g., from about 0.01 to about 5% by weight of the total charge.

The catalysts used in the interpolymerization reaction are selected from any of the known conventional free radical plymerization catalysts heretofore used for the preparation of copolymer latices derived from ethylenic monomers and include inorganic peroxides such as hydrogen peroxide, sodium perchlorate and sodium perborate, inorganic persulfates such as sodium persulfate, potassium persulfate and ammonium persulfate and combinations of the aforesaid with reducing agents such as sodium hydrogen sulfite. Catalyst (including co-catalyst reducing agent, if employed) is generally utilized at a level of from about 0.01 to about 1% by weight of the total charge.

An alkaline buffering agent such as sodium bicarbonate, ammonium bicarbonate, sodium acetate, and the like, may be added to the aqueous system to maintain the pH at the desired value. The amount of buffer is generally about 0.01 to 1.0% by weight, based on the total charge.

The temperature of the interpolymerization reaction herein can be selected at levels which have heretofore been employed in emulsion polymerization processes. Accordingly, temperatures of from about 10° C. to about 95° C. can be used with good results, a temperature of 50° C. to 80° C. is preferred. The pressure is the autogenous pressure generated by the particular mixture of monomers and water at the polymerization temperature selected plus the contribution of any blanketing gas to make up a total pressure of one atmosphere. The blanketing gas may be air or an inert gas such as nitrogen, carbon dioxide, argon, etc. If desired, the total pressure can be increased above atmospheric pressure, to as much as 100 atmospheres, but preferably to 10 atmospheres or less, by increasing the pressure of the blanketing gas, in which case the blanketing gas is one of the aforementioned inert gases, e.g., nitrogen, carbon dioxide, argon, etc. It is, of course, recognized by those skilled in the art that at the lower end of the temperature range, it may be necessary to employ a reducing agent to generate the free radicals required for initiating polymerization.

EXAMPLE I

This example illustrates the preparation of an oligomer mixture having the structural formula:

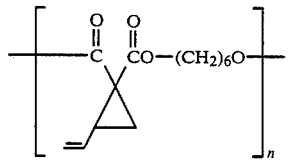

in which n has an average value of about 4.

An aqueous solution (50%) of potassium hydroxide (168 g) was added dropwise to a vigorously stirred solution of 125 g (1.0 mol) trans 1,4-dichlorobutene-2, 80 g (0.5 mol) diethyl malonate and 3.2 g tricaprylmethylammonium chloride while maintaining the temperature at 25°–30° C. When the addition was complete, the mixture was stirred at ambient temperature for five hours and water was then added to dissolve suspended salts. After separation of the phases followed by washing of the aqueous phase three times with ethyl ether, the organic portion was distilled to obtain 21.3 g diethyl 1-vinylcyclopropane-2,2-dicarboxylate. Bp 64°–66° C. (0.15 mm); $n_D$ 27° 1.4512; [lit. bp 69°–72° C. (0.5 mm); $n_D$ 19° 1.4528]. Infrared and proton nmr spectra were also consistent with the desired compound.

Diethyl-1-vinylcyclopropane-2,2-dicarboxylate (3180 gms; 15 mols) and 1772.7 gms 1,6-hexanediol (15 mols) were charged to a reactor with 5.99 gms dibutyltin oxide and 1.19 gms calcium diacetate. The reaction mixture was heated with agitation and the temperature of the reaction mixture gradually raised to 124°–126° C. while maintaining a vacuum of 130 mm Hg. As the rate of distillate removal slowed, the pressure was gradually decreased to 95 mm Hg. After about 8 hours when about 80% transesterification had been achieved based on the amount of ethanol recovered, heating was terminated. The reaction mixture was allowed to cool and the vacuum broken with nitrogen. The final product (Gardner color less than 1, 25° C. Brookfield viscosity 16.8 poise; hydroxyl value 114.4) had a weight average molecular weight (determined by gel permeation chromatography) of 1756. While the product contained material with a degree of polymerization of 1 (n=1) and oligomers having more than five repeating units, it consisted predominantly of oligomeric products having 2 to 5 repeating units. Poly(1,6-hexylene 1-vinylcyclopropane-2,2-dicarboxylate) oligomers of this general type, derived from 1,6-hexanediol, are referred to hereinafter as "Oligomer I" mixtures.

EXAMPLE II

This example illustrates the preparation of an oligomer mixture having the structural formula:

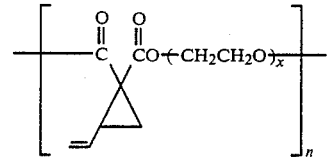

wherein the average values of x and n are 1 to 10 and about 4, respectively.

Five mols poly(ethylene glycol) having an average molecular weight of about 200 and 5 mols diethyl 1-vinylcyclopropane-2,2-dicarboxylate, prepared as in Example I, were combined with 2.5 gm dibutyltin oxide, 0.5 gm calcium acetate and about 0.1% p-methoxyphenol. The reaction mixture was heated at 145°–151.5° C. while removing ethanol, and after 73% of the theoretical amount of ethanol was recovered, the reaction was terminated. The resulting oligomeric product had a Gardner color less than 1, and a 25° C. viscosity of 27 poise. Oligomeric products of this type, derived from poly(ethylene glycol) are referred to hereinafter as "Oligomer II" mixtures.

EXAMPLE III

This example illustrates the preparation of latexes (Part A) in accordance with the present invention from vinyl acetate, butyl acrylate and the 1-vinylcyclopropane-2,2-dicarboxylate polyester oligomer mixtures disclosed in Examples I and II. In addition, latexes prepared in Part A were each formulated into otherwise identical semi-gloss latex paint formulations (Part B)

provided by the Borden Chemical Co. In a control experiment, Polyco 2151-HS, a vinyl acetate-acrylate ester latex supplied by Borden Chemical Co., was also formulated in the same semi-gloss latex paint formulation; Polyco 2151-HS is recommended by its manufacturer as a latex imparting excellent wet adhesion to semi-gloss latex paints.

Part A

A solution was prepared by dissolving 2 gm of polyvinylpyrrolidone (PVP-K30, GAF Corporation) and 2.2 gm sodium acetate in 430 cc of deionized water. This solution, 40 gm Trycol OP-407 and 20 gm of Emersal 6400 were charged to a water-jacketed reactor. The contents of the reactor were heated to 55° C. and 40 gm vinyl acetate was added thereto over a period of ten minutes, and thereafter, at a temperature of 61° C., 1.6 gm of ammonium persulfate dissolved in 10 gm deionized water was also added to the contents of the reactor. When the reactor temperature reached 77° C., the following monomer mixture was introduced into the reactor over a period of 80–90 minutes:

315 gm vinyl acetate,
65 gm butyl acrylate, and half of the total amounts of Oligomer I or Oligomer II mixture shown in Table 1, as these mixtures are defined in Examples I and II, respectively.

The temperature of the reaction mixture was maintained at 78°–80° C. Following the addition of this monomer mixture, a further monomer mixture containing:

355 gm vinyl acetate,
85 gm butyl acrylate, and the remaining half of the aforesaid Oligomer I or II mixture was added to the reactor over a like 80–90 minute period, again at a temperature of 78°–80° C.

Following completion of the further addition of monomers, 0.1 gm ammonium persulfate in 10 gm deionized water was added to the reactor. The reactor temperature then rose to about 82°–84° C. and was maintained at this level for about 30 minutes to complete the interpolymerization reaction. Following cooling of the reactor, an aqueous latex was obtained containing finely-dispersed particles of a vinyl acetate-butyl acrylate-Oligomer I or II mixture interpolymers. In all, three latexes were prepared which differ in nature and amount of Oligomer I and II mixture that was added (Table 1).

Part B

Each of the latexes of Example III and Polyco 2151-HS, were individually incorporated into an interior semi-gloss paint formulation. The formulation is provided in Borden Chemical Company's brochure entitled "Polyco 2151 HS High Solids Vinyl/Acrylic Copolymer Emulsion. For Interior and Exterior Paints and For Semi-Gloss Paints", Paint formulation GVW 31-2151 HS, June, 1977.

PAINT FORMULATION
GVW 31-2151-HS
Interior Semi-Gloss White Paint
Based on Polyco 2151-HS High Solids
Vinyl/Acrylic Copolymer Emulsion

|  | Pounds | Gallons |
|---|---|---|
| 3% Natrosol 250 KR Solution[1] | 75.0 | 9.00 |
| Tamol 731 - 25%[2] | 11.0 | 1.15 |
| Propylene Glycol | 100.0 | 11.57 |
| Merbac 35[3] | 1.0 | .12 |
| Drew L475[4] | 4.0 | .53 |
| Titanox 2020[5] | 275.0 | 8.04 |
| Barytes[6] | 75.0 | 2.05 |
|  | 541.0 | 32.46 |

-continued

PAINT FORMULATION
GVW 31-2151-HS
Interior Semi-Gloss White Paint
Based on Polyco 2151-HS High Solids
Vinyl/Acrylic Copolymer Emulsion

|  | Pounds | Gallons |
|---|---|---|
| Disperse with a high speed disperser and let down with: | | |
| Polyco 2151-HS | 376.5 | 40.90 |
| Triton GR-7[7] | 2.0 | .23 |
| Water and/or 3% Natrosol 250 KR | 259.2 | 31.10 |
| Solution (for viscosity adjustment) | | |
|  | 1178.7 | 105.49 |

[1]Hydroxyethylcellulose thickener (Hercules, Inc.)
[2]Sodium salt of polymeric carboxylic acid (Rohm & Haas Co.)
[3]A 20% aqueous solution of chloromethoxy-acetoxy-mercuripropane (Troy Chemical Co.) was substituted as fungicide for Merbac 35.
[4]Antifoaming agent (Drew Chemical Co.)
[5]Titanium dioxide pigment (NL Industries)
[6]Barium Sulfate
[7]Dioctyl sodium sulfosuccinate (Rhom & Haas Co.)

A masterbatch grind was made of the ingredients in the upper part of the formulation with a Cowles dissolver. Each ingredient was taken in an amount that was 1/45.4 of the amount in the above formulation. Thereafter, 271 g of the masterbatch was let down with 188 g of the candidate latex, 1 g of Triton GR-7, and the viscosity of the resulting paint was adjusted to 77–78 Krebs Units by adding water and 3% aqueous Natrosol 250 KR solution (total volume, 130 ml). Specimens for the wet adhesion test were prepared as follows:

Wooden blocks were primed with an oil base primer and allowed to age a minimum of ten days. One surface of the blocks, thus primed, was then painted with one and two coats, side by side, so that one and two-coat surfaces were available for test, if desired. Where two coats were applied, one hour drying was allowed between coats. The painted specimens were then permitted to dry for twenty-four hours and thereafter placed in water with the painted surface face down.

The painted surfaces were observed at fifteen minute intervals for one hour, at thirty minute intervals for the second hour, and at the end of four hours. Blister size and amount of blistering were recorded by comparison with photographic standards. After four hours of soaking, the paints were cross-hatched and taped with masking tape immediately upon removal and after twenty minutes dry time. Ratings were based on the amount of paint removed from the primer when the tape was pulled on a comparative basis with the control (controls were either Polyco 2151-HS [Borden] or Polytex 667 [Celanese]). Both these commercial latexes are known to give paints with excellent wet adhesion properties.

Table I, last two rows, shows the wet adhesion test results obtained with interior semi-gloss paints prepared with the three experimental latexes of this example and the Polyco 2151-HS. It is evident that the three experimental latexes, containing Oligomer Mixtures I and II of this invention, provide paints with better adhesion as evidenced by the cross-hatch test. Resistance to blistering, however, is essentially the same.

TABLE I

| Component, gm | Polyco 2151-HS Control | Experimental Latex No. | | |
|---|---|---|---|---|
|  |  | 1 | 2 | 3 |
| Deionized water | — | 460 | 455 | 455 |
| Vinyl Acetate | — | 720 | 720 | 720 |
| Butyl Acrylate | — | 150 | 150 | 150 |
| Oligomer Mixture | | | | |

TABLE I-continued

| | | | | |
|---|---|---|---|---|
| No. I | — | 4 | 6 | — |
| No. II | — | — | — | 4 |
| Trycol OP-407 | | 40 | 40 | 40 |
| Emersal 6400 | | 20 | 20 | 20 |
| PVP-K30 | | 2 | 2 | 2 |
| Ammonium Persulfate | | 1.6 | 1.6 | 1.6 |
| Sodium Acetate | | 3.2 | 3.2 | 3.2 |
| Evaluation of Latex in Interior Semi-Gloss Paint | | | | |
| Blistering | Standard | Equal | Equal | Equal |
| Cross-Hatch | Standard | Much Better | Better | Much Better |

EXAMPLE IV

In the manner described in Example III, four additional latexes were prepared and incorporated into interior semi-gloss paint formulations (Table II). The only substantial difference in the latex preparation process was that Emersal 6453 was substituted for Emersal 6400.

It is apparent that latexes made with Oligomer Mixture I provide semi-gloss paints that show better wet adhesion properties than the paint with the Polyco 2151-HS control (compare paint from Experimental Latex Nos. 5 and 7).

TABLE II

| Component, gm | Polyco 2151-HS Control | Experimental Latex No. | | | |
|---|---|---|---|---|---|
| | | 4 | 5 | 6 | 7 |
| Deionized water | — | 450 | 450 | 490 | 450 |
| Vinyl Acetate | — | 720 | 720 | 780 | 720 |
| Butyl Acrylate | — | 150 | 150 | 163 | 150 |
| Oligomer Mixture I | — | 2 | 4 | 6.4 | 8 |
| Trycol OP-407 | — | 40 | 40 | 43.5 | 40 |
| Emersal 6453 | — | 20 | 20 | 21.3 | 20 |
| PVP-K30 | — | 2 | 2 | 2 | 2 |
| Ammonium Persulfate | — | 1.6 | 1.6 | 1.7 | 1.7 |
| Sodium Acetate | — | 3.2 | 3.2 | 3.2 | 3.2 |
| Evaluation of Latex in Interior Semi-Gloss Paint | | | | | |
| Blistering | Standard | Equal | Better | Better | Better |
| Cross-Hatch | Standard | Slightly Better | Better | Equal | Better |
| 60° Gloss | 37 | — | 36 | 37 | 33 |

EXAMPLE V

Four additional experimental latexes were prepared essentially as described in Example III, Part A. However, a minor amount of acrylic acid (8.7 g) was incorporated in each of the polymerizations and three different ethylene oxide-extended forms of sodium lauryl sulfate were employed, i.e., Emersal 6453 (3 moles of ethylene oxide), Standapol ES-13 (3.5 moles of ethylene oxide) and Avirol 125-E (12 moles of ethylene oxide). Interior semi-gloss paints were made up with each experimental latex and with Polyco 2151-HS as a control. The wet adhesion performance of each was tested as described in Example III, Part B. Results are tabulated in Table III.

From the data of Table III, it is seen that latexes made with acrylic acid and one or another of the oligomer mixtures of the invention provide better wet adhesion performance in interior semi-gloss paints than Polyco 2151-HS, as evidenced by the fact that under the test conditions the wet painted surfaces show much less blistering and much less tendency to be removed in the cross-batch test. Moreover, some of the paints made from the experimental latexes had higher 60° gloss readings than the control.

TABLE III

| Component, gm | Polyco 2151-HS Control | Experimental Latex No. | | | |
|---|---|---|---|---|---|
| | | 8 | 9 | 10 | 11 |
| Deionized water | — | 455 | 455 | 455 | 455 |
| Vinyl Acetate | — | 720 | 720 | 720 | 720 |
| Butyl Acrylate | — | 150 | 150 | 150 | 150 |
| Acrylic Acid | — | 8.7 | 8.7 | 8.7 | 8.7 |
| Oligomer Mixture | | | | | |
| No. I | — | 4.6 | 4.6 | 4.6 | — |
| No. II | — | — | — | — | 4.6 |
| Trycol OP-407 | — | 40 | 40 | 40 | 40 |
| Emersal 6453 | — | 20 | — | — | — |
| Standapol ES-13 | — | — | 20 | — | — |
| Avirol 125-E | — | — | — | 10 | 10 |
| PVP-K30 | — | 2 | 2 | 2 | 2 |
| Ammonium Persulfate | — | 1.6 | 1.7 | 1.7 | 1.7 |
| Sodium Acetate | — | 3.2 | 3.2 | 3.2 | 3.2 |
| Evaluation of Latex in Interior Semi-Gloss Paint | | | | | |
| Blistering | Standard | Much Better | Much Better | Much Better | Better |
| Cross-Hatch | Standard | Much Better | Much Better | Much Better | Much Better |
| 60° Gloss | 37 | 37 | 39 | 40 | 39 |

EXAMPLE VI

Two additional latexes were prepared substantially as described in Example III, Part A. In the first of these, Emersal 6400 was employed as the anionic surfactant while in the preparation of the second latex, Emersal 6453 was substituted as the anionic surfactant component. The two latexes were thereafter incorporated into interior semi-gloss paints as described in Example III, Part B, but instead of Polyco 2151-HS, Polytex 667 (Celanese Corp.) was used as the commercial latex for comparative purposes. Details of the preparation of the experimental latexes and testing of the wet adhesion resistance of the interior semi-gloss paints made therefrom are in Table IV. As compared to the Polytex 667 control, the experimental latexes do not give any clear-cut improvement in performance.

TABLE IV

| Component, gm | Polytex 667 Control | Experimental Latex No. | |
|---|---|---|---|
| | | 12 | 13 |
| Deionized water | — | 460 | 450 |
| Vinyl Acetate | — | 720 | 720 |
| Butyl Acrylate | — | 150 | 150 |
| Oligomer Mixture I | — | 4 | 4 |
| Trycol OP-407 | — | 40 | 40 |
| Emersal 6400 | — | 20 | — |
| Emersal 6453 | — | — | 20 |
| PVP-K30 | — | 2 | 2 |
| Ammonium Persulfate | — | 1.6 | 1.6 |
| Sodium Acetate | — | 3.2 | 3.2 |
| Evaluation of Latex in Interior Semi-Gloss Paint | | | |
| Blistering | Standard | Equal | Superior |
| Cross-Hatch | | | |
| One Coat | Standard | Slightly Inferior | Slightly Inferior |
| Two Coats | Standard | Slightly Superior | Slightly Superior |
| 60° Gloss | 34–36 | 31 | 33 |

EXAMPLE VII

In this example, a minor amount of acrylic acid was again incorporated in the latex preparation process which was performed substantially as described in Example III, Part A. In all, four experimental latex preparations were prepared (Table V). However, different anionic surfactants were employed, either Standapol ES-13 or Avirol 125-E.

From the evaluation of the wet adhesion performance of semi-gloss paints made from the experimental latexes, and from Polytex 667 as a control, it is evident that the inclusion of acrylic acid, without any oligomer mixture (Experimental Latex No. 14), produces better wet adhesion results as well as better gloss than Polytex 667. When Oligomer Mixture I is included in the latex preparation at 4.6 g along with Standapol ES-13, similar wet adhesion results are obtained with slightly lower gloss (Experimental Latex No. 15). Substitution of Standapol ES-13 with Avirol 125-E, however, definitely gave poorer results (Experimental Latex No. 16). But when the Oligomer Mixture I level was increased to 6 g, and Standapol ES-13 was again employed as the anionic surfactant, a definitely better wet adhesion performance was observed, with a gloss value equal to the control (Experimental Latex No. 17). The very low tendency to blister is particulary notable.

TABLE V

| Component, gm | Polytex 667 Control | Experimental Latex No. | | | |
|---|---|---|---|---|---|
| | | 14 | 15 | 16 | 17 |
| Deionized water | — | 455 | 455 | 455 | 450 |
| Vinyl Acetate | — | 720 | 720 | 720 | 720 |
| Butyl Acrylate | — | 150 | 150 | 150 | 150 |
| Acrylic Acid | — | 8.7 | 8.7 | 8.7 | 8.7 |
| Oligomer Mixture I | — | — | 4.6 | 4.6 | 6 |
| Trycol OP-407 | — | 40 | 40 | 40 | 40 |
| Standapol ES-13 | — | 20 | 20 | — | 20 |
| Avirol 125-E | — | — | — | 10 | — |
| PVP-K30 | — | 2 | 2 | 2 | 2 |
| Ammonium Persulfate | — | 1.7 | 1.7 | 1.7 | 1.7 |
| Sodium Acetate | — | 3.2 | 3.2 | 3.2 | 3.2 |
| Evaluation of Latex in Interior Semi-Gloss Paint | | | | | |
| Blistering | Standard | Superior | Superior | Superior | Very Superior |
| Cross-Hatch | | | | | |
| One Coat | Standard | Superior | Superior | Equal | Superior |
| Two Coats | Standard | Slightly Superior | Slightly Inferior | Slightly Inferior | Superior |
| 60° Gloss | 34–36 | 40 | 38 | 37 | 35 |

As these data show, paint formulations prepared with the interpolymer latices of the present invention generally significantly outperformed control paint formulations prepared with commercially available latexes based on a vinyl/acrylic copolymer.

What is claimed is:

1. An interpolymer derived from the interpolymerization of
   (a) a vinyl ester of an alpha-unbranched saturated monocarboxylic acid;
   (b) a monomer selected from the group consisting of an alkyl ester of an alpha, beta ethylenically unsaturated monocarboxylic acid and a vinyl ester of an alpha-branched saturated monocarboxylic acid; and
   (c) a vinylcyclopropanedicarboxylate polyester oligomer or mixture thereof of the formula:

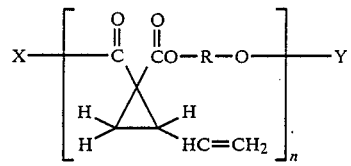

wherein R is a bivalent radical derived from a $C_{2-12}$ aliphatic diol, $C_{3-12}$ cycloaliphatic diol, $C_{8-10}$ aromatic diol or ether diol having from about 4 to about 60 carbon atoms and about 1 to about 30 ether moieties, n is an integer from about 1 to about 20 and X and Y are terminating groups.

2. The interpolymer of claim 1 which further comprises (d) an alpha, beta ethylenically unsaturated carboxylic acid.

3. The interpolymer of claim 1 wherein the vinyl ester of an alpha-unbranched saturated monocarboxylic acid is vinyl acetate.

4. The interpolymer of claim 1 which further comprises one or more other ethylenically unsaturated monomers copolymerizable with (a), (b) and (c).

5. The interpolymer of claim 1 wherein the alkyl ester of an alpha, beta ethylenically unsaturated monocarboxylic acid is an alkyl ester of acrylic acid or methacrylic acid.

6. The interpolymer of claim 1 wherein the alkyl ester of an alpha, beta ethylenically unsaturated monocarboxylic acid is butyl acrylate.

7. The interpolymer of claim 1 wherein the vinyl ester of an alpha-branched saturated monocarboxylic acid possesses the formula:

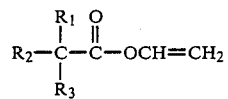

wherein $R_1$ and $R_2$ each represents the same or different alkyl radicals of normal, branched or cyclic structure and $R_3$ represents hydrogen or alkyl radical.

8. The interpolymer of claim 7 wherein the sum of the carbon atoms present in $R_1$, $R_2$ and $R_3$ does not exceed about 30.

9. The interpolymer of claim 7 wherein a mixture of such vinyl esters are employed, in which $R_1$, $R_2$ and $R_3$ each is a saturated alkyl group.

10. The interpolymer of claim 1 wherein, in the vinylcyclopropanedicarboxylate polyester oligomer, X is hydroxy, alkoxy or the group —OROH, where R is a bivalent radical derived from a $C_{2-12}$ aliphatic diol, $C_{3-12}$ cycloaliphatic diol, $C_{8-20}$ aromatic diol or ether diol having 4 to 60 carbon atoms and 1 to about 30 ether moieties and Y is hydrogen or the radical

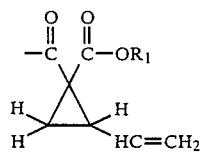

where $R_1$ is hydrogen or a $C_{1-14}$ alkyl group.

11. The interpolymer of claim 10 wherein, in the vinylcyclopropanedicarboxylate polyester oligomer or mixture thereof, n is an integer from 1 to about 10.

12. The interpolymer of claim 1 wherein the vinylcyclopropanedicarboxylate polyester oligomer is a mixture of oligomers, the major part by weight of said mixture being made up of oligomers in which n is 1 to about 10.

13. The interpolymer of claim 12 wherein, in the vinylcyclopropanedicarboxylate polyester oligomer or mixture thereof, X is hydroxy, alkoxy or the group —OROH where R is a bivalent radical derived from $C_{2\text{-}12}$ aliphatic diol, $C_{3\text{-}12}$ cycloaliphatic diol, $C_{8\text{-}20}$ aromatic diol or ether diol having from about 4 to about 60 carbon atoms and about 1 to about 30 ether moieties and Y is hydrogen or the radical

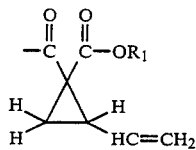

where $R_1$ is hydrogen or a $C_{1\text{-}4}$ alkyl group.

14. The interpolymer of claim 13 wherein the vinylcyclopropanedicarboxylate polyester oligomer or mixture thereof has an average molecular weight from about 200 to about 15,000 and a 24° C. viscosity of about 0.2 to about 200 poise 15. The interpolymer of claim 14 wherein the average molecular weight of the vinylcyclopropanedicarboxylate polyester oligomer or mixture thereof is about 300 to about 6,000 and the viscosity is about 0.3 to about 150 poise.

16. The interpolymer of claim 1 wherein the vinylcyclopropanedicarboxylate polyester oligomer or mixture thereof is obtained by the reaction of 1-vinylcyclopropane-2,2-dicarboxylic acid or $C_{1\text{-}4}$ alkyl ester thereof with a diol selected from the group consisting of $C_{2\text{-}12}$ aliphatic diol, $C_{3\text{-}12}$ cycloaliphatic diol, $C_{8\text{-}20}$ aromatic diol or ether diol having from 4 to about 60 carbon atoms and 1 to about 30 ether moieties, the respective reactants present in an equivalents ratio from about 2:1 to about 1:2.

17. The interpolymer of claim 16 wherein the equivalents ratio of the reactants is from about 1.3:1 to about 1:1.3.

18. The interpolymer of claim 1 wherein the vinyl ester of an alpha-unbranched saturated monocarboxylic acid (a) is present in an amount between about 40 and about 90 parts by weight.

19. The interpolymer of claim 1 wherein the monomer (b) is present in an amount between about 10 and about 60 parts by weight.

20. The interpolymer of claim 1 wherein the vinylcyclopropanedicarboxylate polyester oligomer or mixtures thereof (c) is present in an amount between about 0.1 and about 1 part by weight.

21. The interpolymer of claim 2 wherein the alpha, beta ethylenically unsaturated carboxylic acid (d) is present in an amount between about 0.5 and about 5 parts by weight.

22. The interpolymer of claim 4 wherein said ethylenically unsaturated monomer is present in an amount up to about 10% by weight.

23. A latex containing the interpolymer of claim 1.

24. A surface coating composition of improved wet adhesion containing an interpolymer of claim 1.

25. A process for preparing an interpolymer latex which possesses a solids content of at least about 45 weight percent from:
(a) a vinyl ester of an alpha-unbranched saturated monocarboxylic acid in an amount representing from about 40 weight percent to about 90 weight percent of the total charge;
(b) a monomer selected from the group consisting of an alkyl ester of an alpha, beta ethylenically unsaturated monocarboxylic acid and a vinyl ester of an alpha-branched saturated monocarboxylic acid; and
(c) a vinylcyclopropanedicarboxylate polyester oligomer or mixture thereof of the formula:

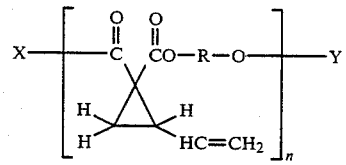

said monomer (b) and said vinylcyclopropanedicarboxylate polyester oligomer or mixtures thereof (c), representing the balance of the total charge which comprises polymerizing said vinyl ester (a), said monomer (b), and said vinylcyclopropanedicarboxylate polyester oligomer (c) in an aqueous emulsion reaction medium containing a polymerization catalyst, with polymerization being continued substantially to completion.

26. The process of claim 25 which further comprises an alpha, beta ethylenically unsaturated carboxylic acid (d).

27. The process of claim 25 wherein the alkyl ester of an alpha, beta ethylenically unsaturated monocarboxylic acid (b) is butyl acrylate.

28. The process of claim 25 wherein the vinyl ester of an alpha-branched saturated monocarboxylic acid (b) possesses the structural formula:

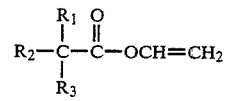

wherein $R_1$ and $R_2$ each represents the same or different alkyl radicals of normal, branched or cyclic structure and $R_3$ represents hydrogen or alkyl radical.

29. The process of claim 28 wherein the sum of the carbon atoms present in $R_1$, $R_2$ and $R_3$ does not exceed about 30.

30. The process of claim 25 wherein the vinyl ester of an alpha-unbranched saturated monocarboxylic acid (a) is vinyl acetate.

31. The process of claim 26 wherein the vinyl ester of an alpha-unbranched saturated monocarboxylic acid (a) is vinyl acetate.

32. The process of claim 28 wherein a mixture of such vinyl esters are employed in which $R_1$, $R_2$ and $R_3$ each is a saturated alkyl group.

33. The process of claim 25 in which one or more other ethylenically unsaturated monomers copolymerizable with the vinyl ester of an alpha-unbranched saturated monocarboxylic acid (a), monomer (b) and vinylcyclopropanedicarboxylate polyester oligomer or mixtures thereof (c) present in an amount of up to about 10 weight percent of the total charge is added at the commencement of, or during, polymerization.

34. The process of claim 26 in which one or more other ethylenically unsaturated monomers copolymerizable with the vinyl ester of an alpha-unbranched saturated monocarboxylic acid (a), monomer (b) and vinylcyclopropanedicarboxylate polyester oligomer or mixtures thereof (c) present in an amount of up to about 10 weight percent of the total charge is added at the commencement of, or during, polymerization.

35. The process of claim 25 in which the reaction medium additionally contains at least one surface active agent selected from the group consisting of nonionic surface active agents, anionic surface active agents, and mixtures thereof.

36. The process of claim 26 in which the reaction medium additionally contains at least one surface active agent selected from the group consisting of nonionic surface active agents, anionic surface active agents, and mixture thereof.

37. The process of claim 25 in which the reaction medium additionally contains a protective colloid.

38. The process of claim 26 in which the reaction medium additionally contains a protective colloid.

39. The process of claim 25 in which the reaction medium additionally contains an alkaline buffering agent.

40. The process of claim 26 in which the reaction medium additionally contains an alkaline buffering agent.

41. The interpolymer latex prepared by the process of claim 25.

42. The interpolymer latex prepared by the process of claim 26.

43. A surface coating composition of improved wet adhesion containing an interpolymer latex prepared by the process of claim 25.

44. A surface coating composition of improved wet adhesion containing an interpolymer latex prepared by the process of claim 26.

* * * * *